(No Model.) 2 Sheets—Sheet 2.
W. F. DIAL.
SPEED INDICATOR FOR SHAFTING.
No. 508,686. Patented Nov. 14, 1893.
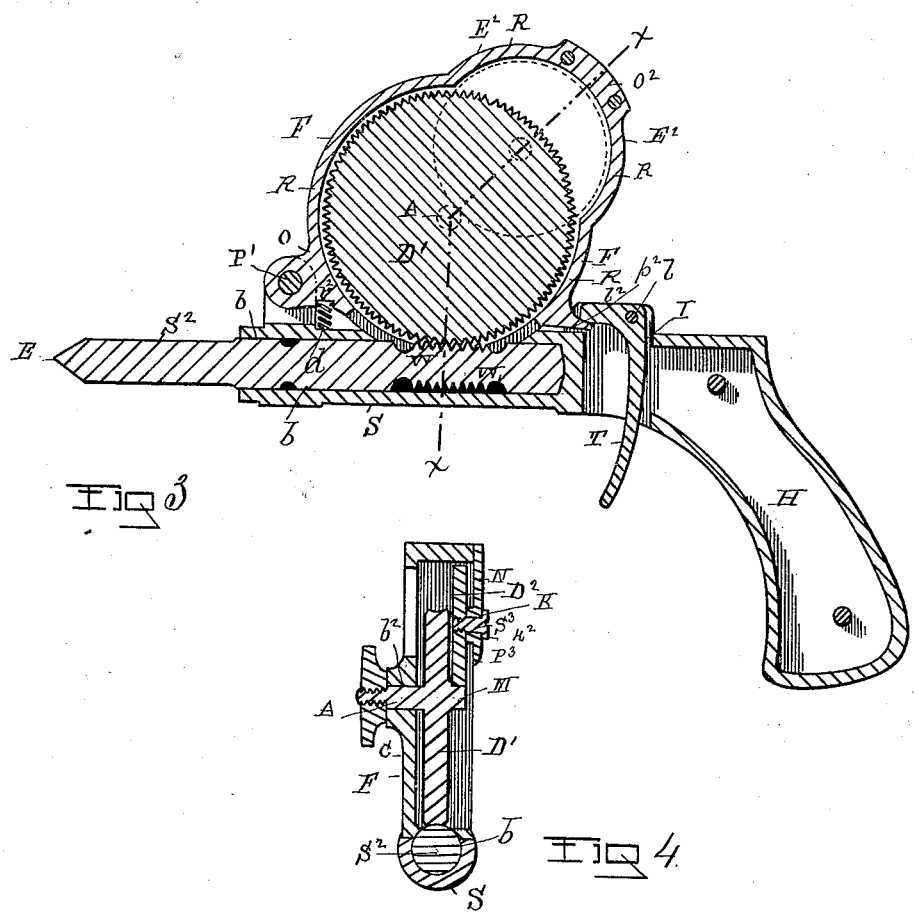

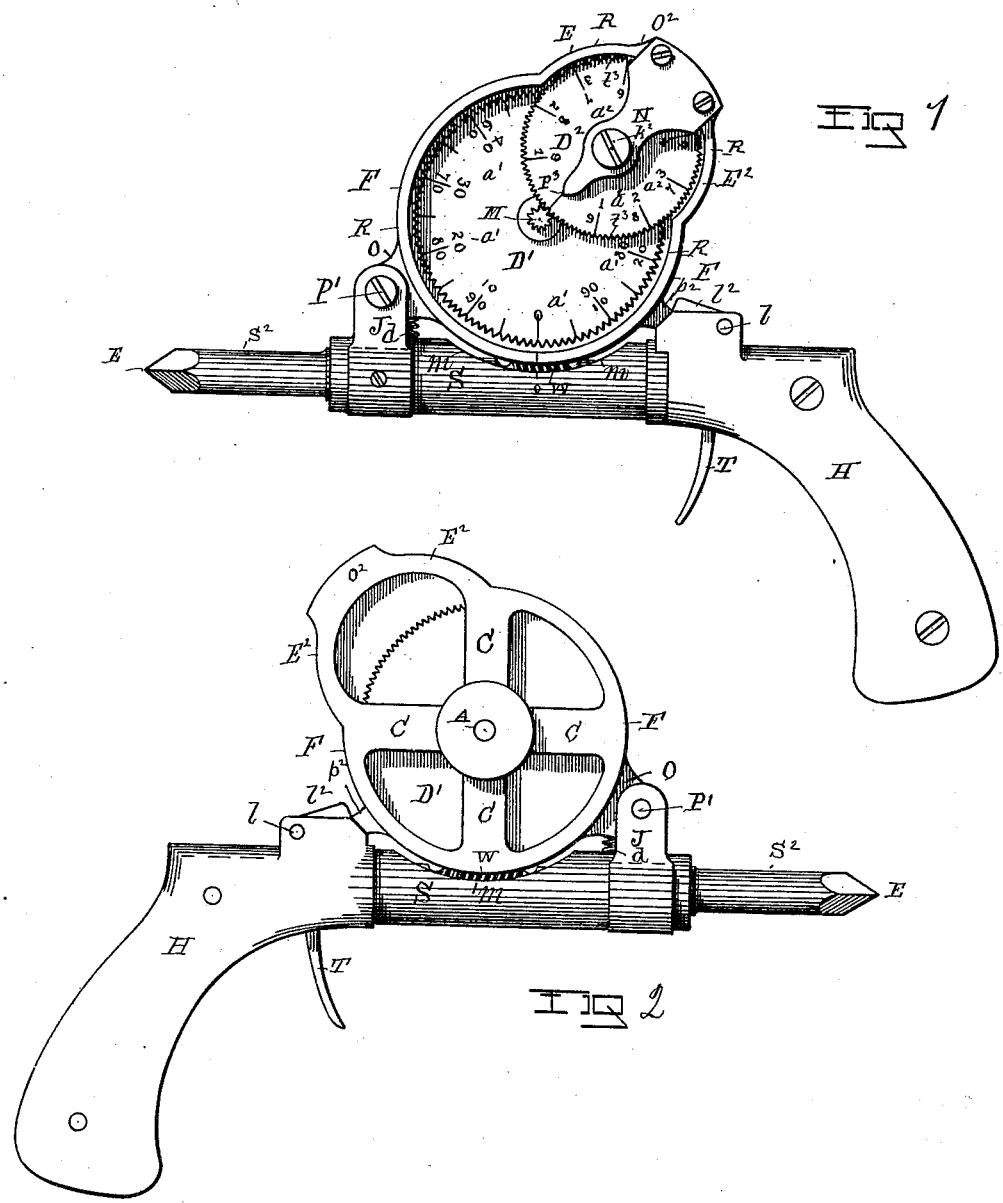

UNITED STATES PATENT OFFICE.

WILBUR F. DIAL, OF BRIDGEPORT, CONNECTICUT, ASSIGNOR TO WM. T. LINTNER AND WM. L. SPORBORG, OF GLOVERSVILLE, NEW YORK.

SPEED-INDICATOR FOR SHAFTING.

SPECIFICATION forming part of Letters Patent No. 508,686, dated November 14, 1893.

Application filed January 5, 1893. Serial No. 457,345. (No model.)

*To all whom it may concern:*

Be it known that I, WILBUR F. DIAL, of Bridgeport, Fairfield county, State of Connecticut, have invented new and useful Improvements in Speed-Indicators, of which the following is a specification.

My invention relates to improvements upon that class of devices termed speed indicators which are used to determine the number of revolutions made by revolving shafts within a given time, and more particularly that implement of this kind which is illustrated and described in Letters Patent No. 418,441, dated December 31, 1889, and my improvements have for their object its better adaptation to the uses for which it is designed.

In the speed indicator described and shown in the before named Letters Patent, two indicating dial wheels are used, and they are arranged upon one shaft; one of them turning on, and the other with the latter, with the said shaft constructed to journal in a frame that at one of its edges is pivoted to the stock; the units and tens dial wheel having gear teeth on its perimeter, that are operated to engage with, or disengage from a worm-gear on the contact spindle as the frame is raised or depressed on its pivoted connection with the stock by a trigger-form lever. The hundreds dial wheel being made with less diameter than the other dial wheel, is arranged to turn on the same shaft, and placed in front of it, and the dial wheel indicating hundreds is actuated at each revolution of the units and tens wheel by a spring-pin arranged in the latter and a projection on one of the crossbars of the frame by which when the spring-pin is in passing engagement with said projection, it is moved outwardly by the latter to enter one of a graduated series of recesses, and to move the hundreds dial wheel one point on its graduated scale, and to repeat this operation at each revolution of the units and tens dial wheel.

My invention relates to an improved construction of the frame in which the dial-wheels are mounted, to adapt the operation of the dial-wheel indicating hundreds of revolutions by the one indicating units and tens of revolutions, through the addition of an intermediate spur-wheel, arranged on the latter dial-wheel; which spur-wheel meshes into teeth on the perimeter of the other dial-wheel; and a reconstruction of the trigger-form lever operating the frame to descend on its pivoted connection with the stock, so as to cause the teeth on the units and tens dial wheel to engage with the worm-gear on the spindle; this reconstruction of the trigger-form lever adapting it to connect directly with the frame; all of which will be more fully described and set forth in the claims.

Accompanying this specification to form a part of it there are two plates of drawings containing four figures illustrating a speed indicator containing my improvements, with the same designation of parts by letter reference used in all of them.

Of the illustrations Figure 1, is a side elevation of my improved speed indicator with its dial faces fronting the view. Fig. 2, is another side elevation of the same implement with the side face which is opposite to that shown at Fig. 1, illustrated as facing the view. Fig. 3, is a vertical section taken from end to end centrally through the handle, the stock, the contact spindle, the trigger-form lever, the frame, and the units and tens dial wheel. Fig. 4, is a section taken on the line $x, x$, of Fig. 3.

The several parts of the apparatus thus illustrated are designated by letter reference and the function of the parts is described as follows:

The letter S, designates the stock which has a tube-form interior that is closed at its rear end. It is cut away on its upper face so as to make the arc-form opening $m$, and it is provided with a pistol-form handle H.

The letter $S^2$, designates the spindle, which has a pointed outer end E, that is made with angularly arranged tapering faces, and has constructed between its ends the worm-gear W, and it is adapted to journal in the tube-form bearing $b$, within the stock.

The letter F, designates the frame, which is circular in form and has a projecting rim R, on that side of it wherein is placed the dial wheel D'. This frame is made with crossbars C, on its back face, and with an offset O, projected from its side edge by means of which at P', the frame is pivoted to a projection J, that is upcast from the stock.

The letter $d$ designates a spiral spring the lower end of which seats on the stock, and the upper end is arranged with a recess $r^2$, made in the frame. The dial wheel D', has gear teeth on its perimeter, and it is graduated radially at $a'$ on its outer face with a scale indicating units and tens.

The letter A designates the shaft of the dial wheel D', to which shaft the latter is attached and adapted to turn in a bearing $b^2$, in the back of the frame.

The letter T, designates a trigger-form lever which at $l$, is pivoted to the stock, passing up through the latter within a slot I, made therein, with its operating end extending down below stock in front of the handle. This trigger-form lever has an inverted L-form top $l^2$, as shown at Fig. 3, which when the lower end of the trigger is drawn rearwardly the upper end engages with a projection $p^2$, on the frame F, and pulls down the frame and the dial wheel D', on the pivoted connection the frame F, makes with the stock so that the teeth on the perimeter of said dial wheel will mesh into the worm gear on the spindle. and against the force of the spring $d$. With the geared connection thus made between the dial wheel D', and the worm-gear W, when the spindle end is brought in engaging contact with a revolving shaft, as the latter turns the spindle turns also, and with each revolution of the shaft the dial wheel D', will move far enough in rotation to register a unit or one revolution of the shaft upon said dial wheel D', and when the pull upon the trigger is relaxed the frame F, and the dial wheel D', are by the action of the spring $d$, caused to rise and disengage from the geared connection the dial wheel D', makes with the worm-gear on the spindle.

In the older device shown in the Holmes patent before named the frame was operated to descend by a trigger-form lever which was made with a stem arranged to slide in a tube against the force of an encircling spring, the rear end of the stem making a pival connection with a lever which was pivoted to the stock and at its upper end was made with a pin adapted to slide in a slot formed in an arm projected from the frame.

In my improvement the trigger-form lever is constructed to have an inverted L-form which is pivoted to the stock with the upper end of this lever adapted to engage with a lug on the frame so that as this trigger-form lever is pulled rearwardly it engages with the frame thus dispensing with the sliding stem, spring, and pivoted lever of the older device before named.

The letter M, designates a spur-wheel arranged on, and so as to turn with the shaft A, and the dial wheel D'.

The letter $E^2$, designates a semi-circular extension of the frame F, and its rim R, and the letter N, a plate that at its outer end is secured to an offset $O^2$, made in the frame extension $E^2$, and at its inner end is extended toward the center of the dial wheel D', and thereat made with the pointer $P^3$.

The letter $D^2$, designates another dial wheel which is radially graduated to indicate hundreds of revolutions at $a^2$, and this dial wheel $D^2$, is arranged between the frame extension, and the plate N, so as to overlap in part at the front the dial wheel D'. The dial wheel $D^2$, has a pintle shaft $S^3$, that journals in the plate N, at K, and its outer end is provided with a cap $k^2$. This spur-wheel M, on the dial wheel D', meshes into the perimetral teeth $t^3$, of the dial wheel $D^2$, and actuates the latter to turn, so that at every complete revolution of the dial wheel D', the spur-wheel M, will actuate the dial wheel $D^2$, to move so that the pointer on the lower end of the pointer-plate will indicate on the graduated scale of the dial wheel $D^2$, one hundred revolutions. As thus made and arranged a speed indicator can be made having fewer working parts, and costing much less than that shown and described in the Letters Patent before named.

Having thus described my invention, what I claim, and desire to secure by Letters Patent, is—

1. The combination with a stock made with tube-form bearings, and an arc-form top opening; of a spindle made with a pointed outer end, a worm-gear, and arranged to journal in said stock; a circular-form frame having a semi-circular offset extension that is provided with a pointer plate arranged thereon, said frame being at one of its side edges pivoted to said stock; a dial-wheel graduated to indicate units and tens of revolutions made with perimetral teeth, and having a shaft that journals in said frame; a spur-wheel on the outer face of said units and tens dial-wheel made to turn with the latter; a dial-wheel graduated to indicate hundreds of revolutions having perimetral gears arranged to mesh into said spur-wheel and having a shaft with bearings in said pointer plate; a spring arranged between said frame and stock, and a trigger-form lever having an inverted L-form pivoted to said stock and adapted to engage with said frame and draw it downwardly as said lever is pulled rearwardly substantially in the manner as and for the purposes set forth.

2. In a speed indicator the combination with a stock having a pistol-form handle a tube-form bearing made with an arc-form top-opening; of a spindle made with a pointed outer end, a worm-gear and adapted to journal in the tube-form bearing of said stock; a frame that is circular in form, and made with a semicircular form extension, the latter being provided with an exterior plate and pointer; a dial-wheel having a geared perimeter and on its outer face graduated to designate units and tens of revolutions, and having a spur-wheel connected centrally and provided with a shaft that journals in said frame;

a dial-wheel having a geared perimeter adapted to mesh into said spur wheel, and graduated to indicate hundreds, and provided with a pintle shaft that journals in said pointer plate; and a trigger-form lever having an inverted L-form is pivoted to the stock, and adapted when its lower end is moved rearwardly to engage with a lug on said frame to draw the latter downwardly on its pivotal connection substantially as and for the purpose set forth.

3. The combination with the stock S, made with the tube-form bearing $b$, top opening $m$, and handle H; of the spindle $S^2$, having the pointed outer end E, and worm gear W; the frame F, made with the extension $E^2$, pointer plate N, the projection $p^2$, and pivoted to the stock at P', the dial wheel D', having the shaft A, made to journal in said frame, the connected spur-wheel M, and the graduated scale $a'$, the dial wheel $D^2$, having a geared perimeter, a graduated scale $a^2$, and a pintle shaft made to journal in said pointer plate; and a trigger form lever T, made with the L-form upper end $l^2$, constructed and arranged to operate substantially in the manner as and for the purposes set forth.

Signed at the city of Bridgeport this 18th day of November, 1892, and in the presence of the two witnesses whose names are hereto written.

WILBUR F. DIAL.

Witnesses:
GEORGE H. DIMOND,
E. I. VAN HORN.